United States Patent [19]

Smillie, III et al.

[11] Patent Number: 5,052,278
[45] Date of Patent: Oct. 1, 1991

[54] FLUID CYLINDER WITH IMPROVED WEAR RINGS

[75] Inventors: Charles M. Smillie, III, West Bloomfield; Anthony J. Tomac, Troy, both of Mich.

[73] Assignee: C.M. Smillie & Company, Ferndale, Mich.

[21] Appl. No.: 328,915

[22] Filed: Mar. 27, 1989

[51] Int. Cl.⁵ .............................................. F01B 31/10
[52] U.S. Cl. ...................................... 92/159; 92/158; 92/155; 92/153; 92/168; 277/201; 384/13; 384/32
[58] Field of Search ....................... 92/81, 86, 87, 142, 92/153, 155, 158, 159, 240, 157, 160, 52, 168; 277/201, 202; 384/13, 15, 32

[56] References Cited

U.S. PATENT DOCUMENTS

| | | | |
|---|---|---|---|
| 2,827,860 | 3/1958 | Roberts | 92/160 |
| 3,204,536 | 9/1965 | Taylor | 92/155 |
| 3,718,209 | 2/1973 | Moslo | 384/13 |
| 3,777,627 | 12/1973 | Goade | 92/168 |
| 4,005,763 | 1/1977 | Wallis | 92/153 |
| 4,023,469 | 5/1977 | Miller | 92/160 |
| 4,076,103 | 2/1978 | Wallis | 92/153 |
| 4,171,665 | 10/1979 | Stoll | 92/160 |
| 4,557,351 | 12/1985 | Volk | 92/153 |
| 4,759,265 | 7/1988 | Stoll et al. | 92/153 |

FOREIGN PATENT DOCUMENTS

| | | | |
|---|---|---|---|
| 463797 | 3/1950 | Canada | 277/75 |
| 0036538 | 9/1981 | European Pat. Off. | 92/160 |
| 278042 | 3/1913 | Fed. Rep. of Germany | 277/201 |
| 67240 | 6/1914 | Fed. Rep. of Germany | 277/201 |
| 83290 | 6/1920 | Fed. Rep. of Germany | 277/201 |
| 554052 | 6/1932 | Fed. Rep. of Germany | 277/201 |
| 688624 | 2/1940 | Fed. Rep. of Germany | 277/75 |
| 2230950 | 1/1973 | Fed. Rep. of Germany | 384/13 |
| 2320274 | 11/1973 | Fed. Rep. of Germany | 92/155 |
| 0129317 | 8/1950 | Sweden | 384/13 |
| 0732605 | 5/1980 | U.S.S.R. | 92/160 |
| 8776 | of 1893 | United Kingdom | 277/202 |
| 344123 | 3/1931 | United Kingdom | 277/201 |

Primary Examiner—Edward K. Look
Assistant Examiner—Thomas Denion
Attorney, Agent, or Firm—Dykema Gossett

[57] ABSTRACT

A fluid cylinder has improved wear rings in a combination that includes a tube having a tubular wall and first and second end caps. The tubular wall defines a cylinder bore that has a central axis. Each end cap also has a bore extending along the central axis. A piston assembly is mounted in the cylinder bore with a piston rod mounted in the bore of one of the end caps, so that the piston assembly is slidable along the central axis. The piston assembly includes a piston head that has a reservoir defined by an annular recess opening toward the tubular wall. The reservoir houses a prepacked lubricant. One wear ring closes off the annular recess from the tubular wall. The wear ring seal has a plurality of radial apertures extending therethrough, through which lubricant is capable of flowing to lubricate the piston assembly. Another wear ring closes off a reservoir in the bore of an end cap and functions as the first mentioned wear ring also to lubricate the piston assembly.

3 Claims, 2 Drawing Sheets

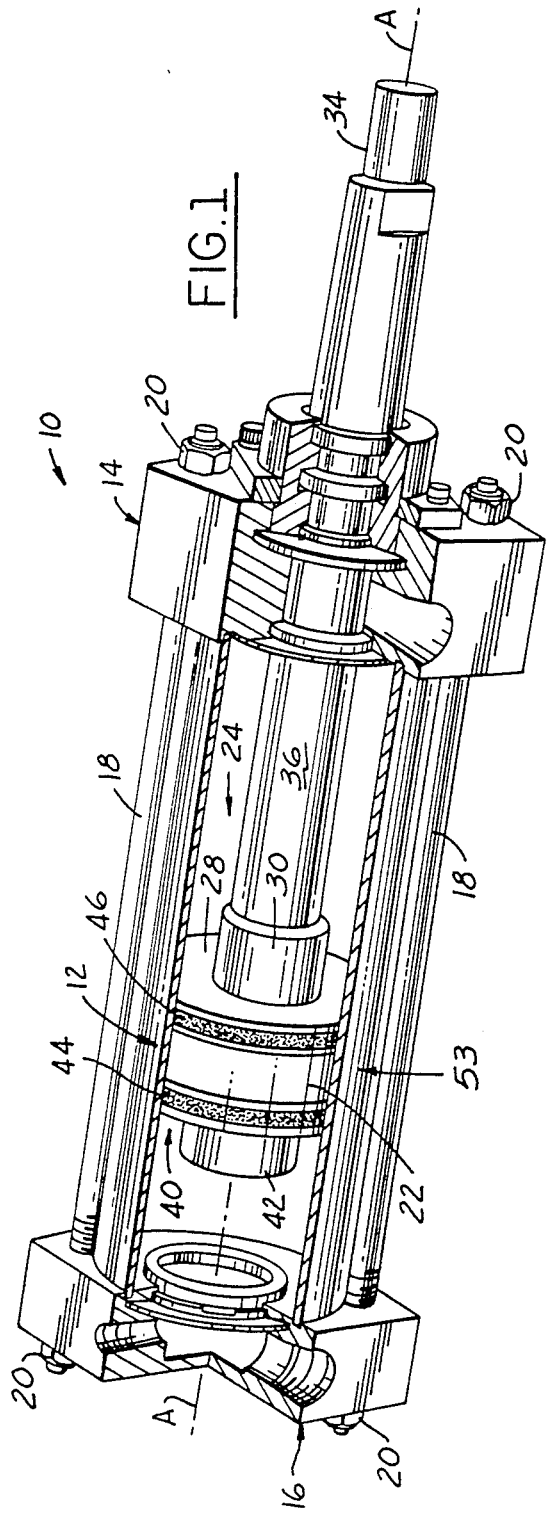
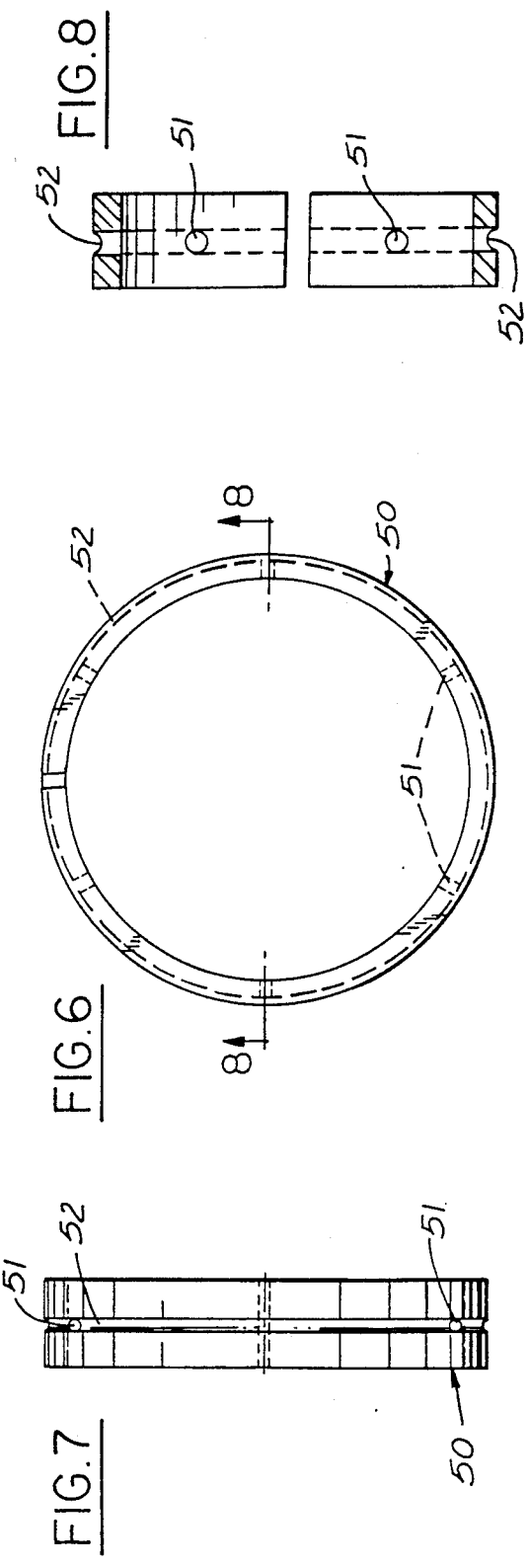

FLUID CYLINDER WITH IMPROVED WEAR RINGS

FIELD OF THE INVENTION

The present invention relates generally to fluid cylinders and, more particularly, to industrial fluid cylinders, including pneumatic cylinders. Still more particularly, the present invention relates to fluid cylinders having improved lubricating wear rings. The invention also relates to fluid cylinders having lubricating wear rings as elements in a novel combination of elements which cooperate to constitute an improved fluid cylinder.

BACKGROUND OF THE INVENTION

Fluid cylinders used in industry are provided with many features of construction and many combinations of parts that adapt the cylinders to particular power and maintenance requirements, to particular applications, and to particular stroke characteristics. As one example, fluid cylinders may be adapted to robotic applications. Fluid cylinders may, as an example, be mounted on fixtures stationed along assembly lines so that their pistons stroke in many different directions to orchestrate various tasks. For these applications, the cylinders are controlled by computers, utilizing feedback signals from sensor devices mounted on the cylinders.

PRIOR ART PATENTS

U.S Pat. No. 4,726,282, issued to LaBair, describes a pneumatic cylinder that has a piston formed of two halves with a reservoir between the halves. As shown particularly in FIG. 6 of the LaBair patent, the reservoir is packed with a lubricating medium over which a sintered bronze ring is positioned, the ring allowing heated, liquified lubricant to seep into the body portion of the cylinder to thereby lubricate it. A similar arrangement is provided in the piston rod as it extends through a projection bore off from the central bore of the cylinder. The system described by LaBair requires that the sintered ring or bearing heat up to allow seepage of the liquified lubricant. Accordingly, there is no pre-lubrication provided by the system. Consequently, inordinate wear takes place at the beginning of a work cycle.

Other systems have been developed for lubricating shafts through bearings and the like:

U.S. Pat. No. 4,696,585, issued to Swearingen, describes a system for metering a lubricant responsively to a shaft vibration in the vicinity of a bearing associated with the system. The associated bearing has channels that do not extend radially through the bearing.

U.S. Pat. No. 4,480,842, issued to Mahyera et al., describes a structure in which there is a lantern ring for introducing a liquid between packing rings and a drill shaft. What is of interest in this structure is that the lantern ring has an opening through it which communicates with a passageway through a side wall to a lubricating source. This structure does not teach use of a prepacked lubricant, but rather, an external source of lubrication.

U.S. Pat. No. 3,907,307, issued to Maurer et al., describes a packing assembly in which a lantern ring has radial openings for introducing lubricants from an external source, also.

U.S. Pat. No. 3,100,647, issued to Lee et al., describes a self-lubricating ring seal. The ring seal is received by annular recesses in a shaft. A plurality of fluid passages are formed through the ring seal which enhance the lubrication of the ring seal. There is no teaching by Lee et al. beyond this notion of modifying a metal piston ring to have lubricating passages to make it self-lubricating by controlling the leakage of the fluid medium.

U.S. Pat. No. 3,031,198, issued to Hudson, describes a lip seal having holes which allow oil to communicate with an oil chamber.

While all of the prior art patents discussed above disclose lubricating ring devices of some interest, none of the devices suggests a construction readily adaptive to replacing the sintered bronze ring assembly of LaBair, which has been shown to suffer the disadvantage of not providing sufficient lubrication at the beginning of a work cycle.

OBJECTS OF THE INVENTION

Accordingly, it is the primary object of the present invention to provide a new and improved fluid cylinder that has an improved wear ring assembly.

It is another object of the present invention to provide a fluid cylinder that is interchangeable in standard equipment using NFPA specification air cylinders, with an improved wear ring assembly that pre-lubricates the cylinder bore, the piston, and the piston rod.

It is yet another object of the present invention to provide an improved wear ring assembly for use with standard equipment cylinders.

Another object of the invention is to provide an improved fluid cylinder having an improved wear ring assembly to enhance its lubrication.

Yet still another object of the invention is to provide an improved fluid cylinder having an improved wear ring assembly in a novel combination with other elements that cooperate to enhance operation of the cylinder by providing for efficient and effective lubrication by a lubrication system that is conveniently maintained.

SUMMARY OF THE INVENTION

These objects are served in the present invention by a fluid cylinder that has improved wear bands or rings with a special lubricant metering system that assures low wear and low friction. The cylinder has a body portion with first and second end caps. The body portion has an inner surface that defines a tube bore between the first and second ends. A piston assembly travels along an axis centered in the bore. First and second end caps are disposed respectively on the first and second ends. Each end cap has at least one planar surface that is generally parallel to the piston axis of travel. The planar surface is at a periphery of a boss integrally projecting from each end cap wall. A first bore extends generally perpendicularly from the planar surface to a central bore concentric and communicating with the tube bore of the body portion. The piston assembly has a piston head, a piston rod, a hub and a hub portion of the piston head. The head portions enter the central bores of each end cap, and it is the hub and hub portions that are detected, as an example, by proximity switches. The piston head has at least one annular recess that is a reservoir for housing a prepacked lubricant such as grease. This reservoir for the lubricant is closed off by a wear ring that has a plurality of apertures radially extending through it so as to allow the lubricant to meter through the wear ring into the body portion. An annular groove extends around the periphery of the wear ring so that the metered lubricant may flow around the ring so that it can cover the wall surface of the cylindrical bore as the piston head strokes back and forth. Within the wall surrounding the bore of at least one end cap assembly, another reservoir of prepacked lubricant is disposed. A wear ring also covers this latter reservoir and also has a plurality of radially extending apertures to allow the lubricant to meter out. Through this latter wear ring, the piston rod extends to be lubricated. Each assembly of wear ring, apertures, reservoir and lubricant is a lubrication assembly that is a principal aspect of the invention.

BRIEF DESCRIPTION OF THE DRAWINGS

FIG. 1 is a perspective cutaway view of a fluid cylinder made in accordance with the teachings of the present invention.

FIG. 6 is an elevational view of the improved wear ring according to the teachings of the present invention.

FIG. 7 is a side elevational view of the wear ring invention, orthogonal to the elevational view of FIG. 6.

FIG. 8 is a cross-sectional view taken in the direction of arrows 8—8 of FIG. 6.

DETAILED DESCRIPTION OF THE PREFERRED EMBODIMENT

Figure 2:
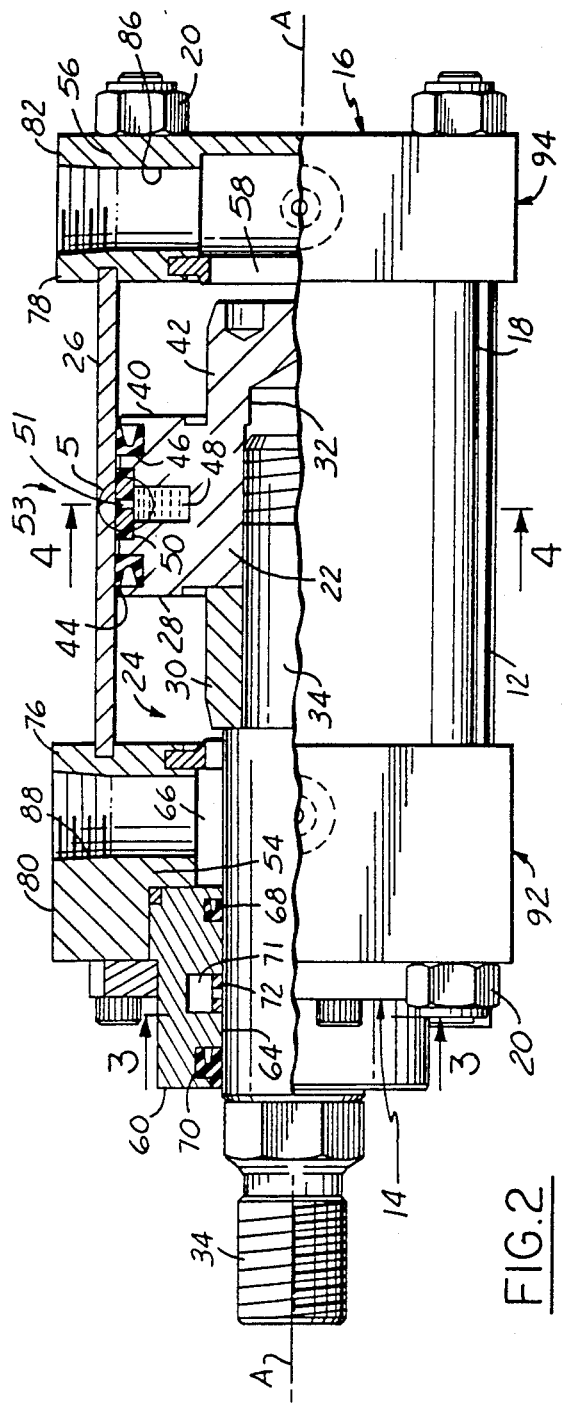
FIG. 2 is a partial elevational view and partial longitudinal cross-sectional view of the embodiment shown in FIG. 1.

Referring first to FIGS. 1 and 2, a fluid cylinder, here shown as a pneumatic cylinder, is generally designated by reference numeral 10. The fluid cylinder 10 includes a body portion 12. A first end cap 14 is shown in FIG. 1 at the front end of the body portion 12. A second end cap 16 is positioned on the back end of body portion 12, as shown in FIG. 1. The end caps 14 and 16 are secured onto the ends of the body portion 12 by conventional means such as by the plurality of tie rods 18. Tie rods 18 are elongated metallic members which have threaded portions on each end, the threaded portions being received by nuts 20 for securing the end caps 14 and 16 to the body portion 12, although nuts 20 are not essential to the invention, as end caps 14 and 16 may have threaded bores for receiving the threaded portions of the tie rods 18.

Body portion 12 comprises a hollow elongated cylinder or tube formed from a metallic material, such as steel. The tube has an inside radius about a central axis A—A defining the cylindrical bore of the tube, which is sized to provide a specific force upon a piston head 22 of a piston assembly 24. As can be seen in FIG. 2, the tube has a wall 26 that is formed from a metallic material, such as steel and has a predetermined thickness.

Still referring to FIGS. 1 and 2, the piston head 22 has a first face 28 on the same side of piston head 22 as a hub 30 of piston assembly 24. A bore 32 runs through hub 30 and into the piston head 22, to enable the piston head 22 to be slid onto a solid piston rod 34, also of piston assembly 24. Bore 32 has a threaded portion to enable piston head 22 to be threadably received onto piston rod 34. Piston rod 34 extends from piston head 22 through hub 30, which is constrained between piston rod 34 and piston head 22. Piston head 22 has a second face 40, which is on the same side of piston head 22 as a hub portion 42 of piston head 22. Piston head 22 is cylindrically shaped and sized to fit within body portion 12 and slide back and forth therein.

A number of annular grooves or recesses are in the outer of cylindrically-shaped piston head 22. Adjacent first face 28 and second face 40, respectively, and between both faces 28 and 40 are grooves for seating piston seals 44 and 46, respectively. Piston seals 44 and 46 are cupped seals having U-shaped cross-sections. Piston seals 44 and 46 are made from a suitable polymeric material and function to reduce fluid flow around piston 26 within body portion 12, so that fluid force is exerted upon piston face 28 or 40.

Between piston seals 44 and 46 is a deeper annular recess that forms an annular reservoir 48. Reservoir 48 is prepacked with a suitable lubricant. Reservoir 48 opens toward wall 26 in body portion 12 of cylinder 10.

At the outer periphery of annular reservoir 48, a shallower, wider groove is situated to seat a wear band or wear ring 50 so that it is positioned over reservoir 48. With respect to axis A—A, wear band or wear ring 50 has an inner radius, an outer radius, and a thickness therebetween. Wear band or wear ring 50, shown in greater detail in FIGS. 6-8, is preferably made of a glass-filled nylon material, chosen for its low coefficient of friction and wearability to facilitate and endure the sliding of piston 26 within body portion 12. A plurality of equispaced apertures 51 extend in a radial direction through wear ring 50. In the preferred embodiment, six apertures 51 extend through wear ring 50. Preferably, wear ring 50 has a groove channel 52 within the surface of the outer periphery of wear ring 50, facing wall 26. Groove channel 52 facilitates flow of the lubricant about the periphery of wear ring 50, after the lubricant emerges from apertures 51. As piston head 22 strokes within body portion 12, the lubricant is spread uniformly and substantially over all of wall 26 within body portion 12. Apertures 51 function to meter lubricant out of reservoir 48 to flow between piston head 22 and wall 26 along groove channel 52.

Reservoir 48, with lubricant therein, and wear ring 50, with apertures 51, are together a lubrication assembly 53. Lubrication assembly 53 has an advantage over conventional means of lubricating a piston head, for example by requiring that parts of the cylinder first be heated up by friction before the lubricant is liquified to flow around sintered bronze rings. The advantage of wear ring 48 is that it pre-lubricates body part 12 by allowing lubricant to flow through apertures 51 immediately as piston head 26 begins its stroke.

Figure 5:
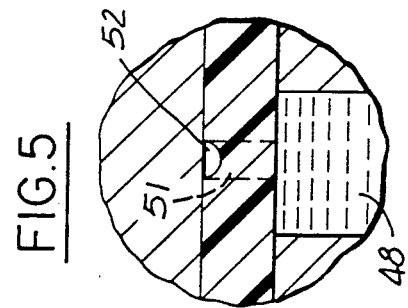
FIG. 5 is an enlarged view of the area shown in circle 5 of FIG. 2.
Figure 4:
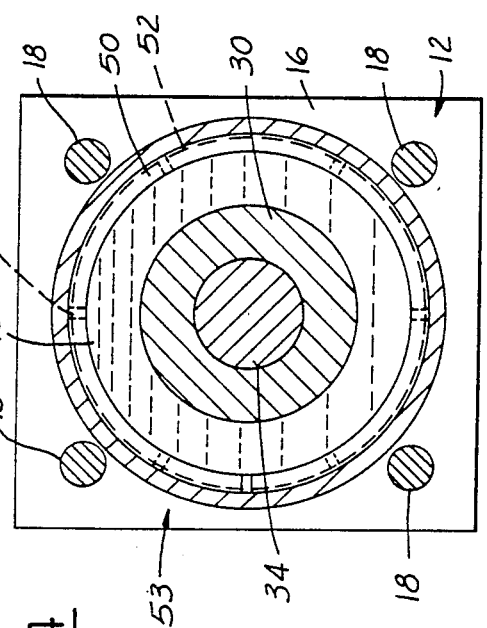
FIG. 4 is a cross-sectional view taken in the direction of the arrows 4—4 of FIG. 2.
Figure 3:
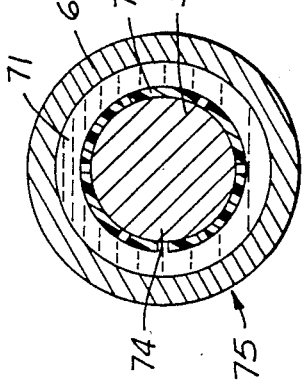
FIG. 3 is a cross-sectional view taken in the direction of the arrows 3—3 of FIG. 2.

Across the radial thickness of wear ring 50 each aperture 51 narrows from reservoir 48 to the outer periphery of wear ring 51 adjacent wall 26, as can be seen with particularity in FIG. 5. This narrowing increases the laminar flow of the lubricant as it emerges from aperture 51. Accordingly, the pressure is reduced causing a pressure gradient from the reservoir to the groove channel 52. Initially, flow is facilitated by flow induced by gravity or by lubricant already within channel groove 52 which is agitated at its boundary against wall 26 when piston head 22 begins stroking. The increased kinetic energy of the lubricant lowers the pressure within channel groove 52 to initiate flow from reservoir 48.

Thus, the Bernoulli effect and laminar flow technology are utilized in metering out the lubrication. Design arrays for the apertures control the metering of lubrication on the dynamic piston seals 44 and 46. The lubrication is sucked out of the reservoir by the vacuum created by the relative movement of piston head 22 with respect to wall 26. The thin film of lubrication spread on wall 26 enhances laminate flow of the cylinder fluid within body 12.

End caps 14 and 16 include end cap walls 54 and 56, respectively. A mounting means for any of a variety of mounting styles well known to those skilled in the art may depend from one or both of the end caps 14 or 16. Examples of such mounting styles are trunnion mounts, clevis mounts, side lug mounts, flange mounts, and extended tie rod mounts. Whichever style is used, those skilled in the art will appreciate that the mount should not interfere with the extension of piston rod 34 through end cap 14. Wall 56 of end cap 16 closes off one end of a central bore 58 through end cap 16. Central bore 58 of end cap 16 opens at its other end to communicate with body portion 12 of cylinder 10. Central bore 58 of end cap 16 is sized to accommodate hub portion 42 of piston head 22.

Projecting from end cap 14 is a cylindrical bearing cartridge 60. As another aspect of the invention, cartridge 60 may be easily removed for rod seal maintenance. Cartridge 60 is retained in its position on end cap 14 by cap screws 62. Cartridge 60 surrounds a rod accommodating bore 64 which opens at one end toward body portion 12 and at the other to the exterior of cylinder 10. The one end of bore 64, that is, the end opening toward body portion 12, opens into a larger, central bore 66, which is sized to accommodate hub 32. Central bore 66, in turn, opens into body portion 12. Bearing cartridge 60 has a rod seal 68 also preferably made from a suitable polymer or polymeric material (as piston seals 44 and 46). Rod seal 68 is disposed in a groove in the inner surface of bearing cartridge 60 at the rod accommodating bore 64, proximate its innermost end. Bearing cartridge 60 also has a rod wiper 70 disposed in another groove in the inner surface of bearing cartridge 60, at the rod-accommodating bore 64 proximate its outermost end. Rod wiper 70 excludes dirt and grit from the fluid cylinder 10.

Between seal 68 and rod wiper 70, also in the inner surface of bearing cartridge 60 is an annular reservoir 71. A grease reservoir retainer (another wear ring 72) is positioned over reservoir 71. Wear ring 72 is also preferably made of a glass-filled nylon material chosen for its coefficient of friction and wearability so that it may facilitate and endure sliding of piston rod 34 through its center bore. A plurality of equispaced apertures 74 extend radially through wear ring 72 from an inner radius to an outer radius about axis A—A. The structure of wear ring 72, as with the structure of wear ring 50, facilitates pre-lubrication by allowing the lubricant to flow through apertures 74 of wear ring 72 at the beginning of the stroke of piston rod 34. Reservoir 71, with lubrication, and wear ring 72, with apertures 74, together from another lubrication assembly 75.

Both end caps 14 and 16 are similarly structured with regard to the rest of their features. Accordingly, reference will be made to end cap 14 or 16 having end cap wall 54 or 56, to indicate the respective structures of end cap 14 having end cap wall 54 and end cap 16 having end cap wall 56. Structured integrally with end cap wall 54 or 56 is a boss 76 or 78. Boss 76 or 78 has a planar surface 80 or 82. A first bore 84 or 86 extends through boss 76 or 78 from planar surface 80 or 82, which is a predetermined distance from axis A—A. First bore 84 or 86 is in substantial perpendicular communication with central bore 66 or 60. First bore 84 or 86 preferably has a threaded portion 88 or 90.

Proximity switches, as an example, may be secured to planar surface 80 or 82 as is well known in the prior art. The end caps 14 and 16 are constructed to accept the proximity switches without spacers. Those of ordinary skill in the art are knowledgeable as to how the caps may be machined for use of proximity switches of the same probe length at either end cap 14 or 16, to extend through first bore 84 or 86, respectively. The proximity switches are securable to planar surface 80 or 82 by conventional means, such as screws or bolts. The proximity switches may be used for sensing the stroke of a piston assembly in a manner well known by those of ordinary skill in the art. A second bore, indicated as being generally at 92 or 94, is substantially perpendicular to central bore 66 or 60 and extends from an opening in the periphery of end cap 14 or 16, preferably at a boss, to central bore 66 or 60. Second bore 92 or 94 also has a threaded portion, like the threaded portion 88 or 90, for coupling end cap 14 or 16 to a supply conduit, so that air may be supplied to air cylinder 10 or air may be removed therefrom.

Those of ordinary skill in the art will appreciate that ancillary bores (not shown) may be provided in end cap 14 or 16, generally in perpendicular communication with central bore 66 or 60, for such purposes as controlling air exiting from cylinder 10, thus allowing piston head 26 to have a complete and controlled stroke.

A cushion seal ring 96 or 98, preferably made from a suitable polymer or polymeric material, is positioned in central bore 66 or 60 adjacent body portion 12 to cushion hub 32 or hub portion 42 when piston 26 approaches end cap 14 or 16. As hub 30 or hub portion 42 passes through cushion seal 96 or 98, an air-tight seal causes air remaining in body portion 12 to exit, according to passage provided through ancillary bores in end caps 14 and 16, to control the speed of piston head 22 as it strokes.

The improved fluid cylinder that is the invention thusly has special lubricant metering wear bands or wear rings which assure both low wear and low friction.

Although the invention has been shown and described to respect to a certain preferred embodiment, it is obvious that equivalent alterations and modifications will occur to others skilled in the art upon reading and understanding this specification. The present invention includes all such equivalent alterations and modifications and is limited only by the scope of the claims which are as follows.

We claim:

1. A pneumatic cylinder combination comprising:
    a tube shaped body with an inner radius and extending along a central axis from a first tube end to a second tube end;
    first and second end caps disposed at said first and second tube ends of said body, said first end cap having an end cap wall and a central end cap bore extending along said central axis axially outwardly from said body portion beyond said first tube end, said end cap bore having an inner radius that is less than said inner radius of said tube-shaped body;
    a bearing cartridge received in said central end cap bore, said bearing cartridge including a lubrication assembly with a wear ring having an inner radius, an outer radius and a thickness therebetween, a plurality of apertures extending across said thickness, and a reservoir containing a lubricant, said reservoir defined by an annular recess axially aligned with and radially outward of said wear ring in said bearing cartridge, said annular recess being entirely received within said cartridge, said cartridge extending along said central axis from a first cartridge end to a second cartridge end, a first cartridge seal disposed between said first cartridge end and said wear ring and a second cartridge seal disposed between said second cartridge end and said wear ring; said first and second cartridge seals having inner peripheries extending radially inwardly to approximately the same extent as the inner radius of said wear ring, said bearing cartridge being connected to said end cap such that it is easily removable; and a piston assembly including a generally cylindrically shaped piston head having an outer radius generally equal to the inner radius of said body and a piston rod extending from said piston head outwardly through the inner periphery of said bearing cartridge, said piston assembly reciprocating within said tube-shaped body such that said lubricant within said reservoir is metered outwardly through said apertures to lubricate said piston rod as said piston assembly reciprocates within said tube-shaped body.

2. A pneumatic cylinder as recited in claim 1, wherein said central end cap bore defining a stepped bore and having a first inner periphery of a first relatively greater diameter at an end removed from said tube shaped body, and a second inner periphery of a second relatively smaller diameter adjacent to said first inner periphery in a direction toward said tube-shaped body, said first and second inner peripheries defining a shoulder, said bearing cartridge having an outer periphery with a diameter approximately equal to said first diameter, said bearing cartridge being received within said first inner periphery and abutting said shoulder, and a plurality of bolts maintaining said bearing cartridge in contact with said shoulder to removably secure said bearing cartridge to said end cap.

3. A pneumatic cylinder as recited in claim 2, wherein said piston head having first and second piston head ends and a lubrication assembly including a wear ring having an inner periphery and a generally cylindrical outer periphery with a thickness defined as the distance therebetween, a plurality of apertures extending across said thickness, and a piston reservoir characterized by an annular recess axially aligned with and radially inward of said wear ring in said piston head, said reservoir containing a lubricant, said wear ring being received in a central portion of said piston head between said first and second piston head ends, a first piston head seal spaced between said first piston head end and said wear ring and a second piston head seal disposed between said second piston head end and said wear ring, said first and second piston head seals having outer peripheries extending radially outwardly to approximately the same extent as the outer periphery of said wear ring, said lubricant being metered out through said apertures to lubricate a surface between said piston head an the inner surface of said body as said piston assembly reciprocates within said tube shaped body.

* * * * *